United States Patent Office 3,464,884
Patented Sept. 2, 1969

3,464,884
POLYALLYL ESTER MODIFIED MELAMINE MOLDING
Herman V. Boenig, Lexington, Ky., and James A. Waters, Jr., Bay Village, Ohio, assignors to Brookpark-Royalon, Inc., Sebring, Ohio, a corporation of Ohio
No Drawing. Continuation-in-part of abandoned application Ser. No. 184,659, Apr. 3, 1962. This application June 30, 1966, Ser. No. 561,693
Int. Cl. B32b 27/42
U.S. Cl. 161—248                      5 Claims This application is a continuation in part of application Ser. No. 184,659, filed Apr. 3, 1962, now abandoned.

This invention relates to molded aminoplast articles and to a novel method for their manufacture. More particularly, the invention concerns an aminoplast molded article having an improved stain resistant surface.

As employed herein the term "aminoplast" is intended to denote resinous products obtained by the interaction of an aldehyde, such as formaldehyde, with an amine. Where the amino contains two or more amino groups, thermosetting resins are formed, such as, for example, urea-formaldehyde resins, and melamine-formaldehyde resins. Except where indicated to the contrary, the invention will be illustrated with respect to melamine-formaldehyde molded articles. It is to be understood, however, that the invention is likewise applicable to other aminoplast resins, such as, for example, urea-formaldehyde types.

In many applications of melamine-formaldehyde moldings, such as, for example, dinnerware, resistance to staining is a most important consideration.

Moldings prepared from unfilled melamine-formaldehyde resins ordinarily possess good resistance to staining. However, when filler materials such as, for example, alpha-cellulose fibers, are added to render the molding more resistant to impact, the resistance to staining is substantially reduced. Likewise, the addition of hiding or masking agents, such as, for example, titanium dioxide, pigments, lowers the stain resistance of the molded surface.

In accordance with the invention, it has been found that the addition of an allyl ester prepolymer to the aminoplast molding composition, followed by molding thereof, produces a molding surface having good resistance to staining. During the molding step, the allyl ester prepolymer is concentrated at the surface of the article, and forms an unfilled surface layer. It is believed, but without reliance upon any particular theory, that the aforesaid concentration of the allyl ester prepolymer at the surface of the molding is due to the incompatibility of the aminoplast resin, e.g. melamine-formaldehyde and the allyl ester resin formed. That is, the allyl resin formed is squeezed out of the melamine-formaldehyde resin as the molding operation proceeds. Thus, an inherent characteristic of the allyl ester resin must be that as the melamine-formaldehyde resin cures, thereby shrinking, the allyl ester resin remains sufficiently soft to be squeezed from the melamine resin.

The term "allyl ester prepolymer" as employed herein, is fully understood by those skilled in the art, and refers to the product of conversion of an allyl monomer by partial polymerization under carefully controlled conditions, to a material having residual unsaturation. Thus, for example, the most widely used allyl monomer is the ester diallyl phthalate. When diallyl phthalate is polymerized with a peroxide catalyst under controlled conditions, it is converted to a white powder, which is known as a prepolymer. This prepolymer is sold commercially under the name Dapon resin 35 (FMC Corp., Chemicals and Plastics Division, New York). The Dapon resin can be cured to a highly cross-linked thermosetting resin by the application of heat under standard molding conditions, using a peroxide catalyst.

Examples of suitable allyl esters from which prepolymers are available, include, in addition to diallyl phthalate, also allyl diglycolate, allyl carbonate, and allyl diglycol carbonate.

The allyl ester prepolymer is added to the aminoplast molding composition in an amount ranging from about 5 to about 35 percent by weight of the total composition, preferably between about 5 and about 20 percent.

In relation to the quantity of aminoplast resin, e.g. melamine-formaldehyde resin present in the molding composition, the amount of allyl ester prepolymer will constitute from about 20% to about 50% by weight of the aminoplast resin.

It has been found that the use of greater amounts of allyl ester prepolymer than indicated tends to produce blistering and delamination. It is believed that these defects are caused by the fact that the melamine resin portion of the molding becomes discontinuous when the amount of prepolymer is exceeded.

As molding resins there may be employed, in accordance with the invention, aminoplast resin molding compositions including filler materials, such as, for example, alpha-cellulose. In commercial molding compositions of this type, the proportion of cellulose filler will ordinarily range between about 20% and 60% by weight. A suitable molding resin of the melamine-formaldehyde type, and which has been successfully employed for the purposes of the invention, is that sold under the designation Cymel 1077 (American Cyanamid Co., New York), which contains 27% by weight of alpha-cellulose. Other similar types are Cymel 1500 and 1502 of the same producer. A suitable urea-formaldehyde molding composition is that sold under the designation Sylplast White 1–MUPOL (American Viscose Co.), which may contain about 50% alpha-cellulose filler.

The allyl ester prepolymer is preferably added to the aminoplast resin molding composition in the form of a dry powder. The moding composition may also incorporate other ingredients such as pigments. The ingredients may be ball milled to form a uniform mixture.

The allyl ester prepolymer may be cured by application of heat in the molding step. However, a curing agent therefor may also be added. Suitable as a curing agent is benzoyl peroxide in a concentration up to 3% of the total weight of allyl ester prepolymer; the preferred concentration is 1 to 2 percent.

Conventional molding conditions of temperature, pressure and cycle period may be employed in the practice of the invention.

The present invention is especially useful in the molding of dual color melamine-formaldehyde dinnerware.

For example, in the manufacture of melamine-formaldehyde cups, it is often desirable to have the outer surface a dark color and the inner, or food-contacting surface, white or a light color shade. To achieve this dual-color effect, it is necessary to carry out a two-stage molding operation. In the first stage, the outer portion of the cup is molded, and in the second stage, the inner portion. In order to hide or mask the dark color of the first stage molding, it is necessary to incorporate a high hiding-power filler material in the molding powder or composition employed in the second stage. In so doing, it has been found that the presence of filler material in the melamine resin used to form the inner portion of the molding results in a decrease in the stain resistance of the food-contacting surface. The practice of the invention overcomes this defect and imparts stain resistance.

In the preparation of the dual-color molding, there is employed in the first stage, any conventional melamine molding powder commonly used in the manufacture of dinnerware, such as, for example, Cymel 1077, referred to previously. The resin is suitably pigmented to produce the desired color.

In the second stage, a molding composition comprising a melamine resin containing a high-hiding power filler and a suitable pigment is used.

It should be noted that as the concentration of the allyl ester prepolymer is increased, the impact resistance of the molding is decreased to below the desired level. In such case, a dual-cycle molding technique may be employed, wherein a base member is first formed, using conventional molding materials, and then, in a second cycle a layer of a melamine-formaldehyde with allyl ester prepolymer is molded thereto.

The following examples further illustrate the practice of the invention, but are not to be regarded as limiting.

EXAMPLE 1

240 grams of Cymel 1077, a melamine-formaldehyde molding resin containing 27% alpha cellulose filler, color WB 360, were shaped into a preform in conventional manner. The preform was then dielectrically preheated to a temperature of 220° F. and placed in a dinner-plate mold, the temperature of which was 325–330° F. The mold was closed and a pressure of 3000 p.s.i. was applied for one minute. The cured plate was removed from the mold and allowed to cool, and then was subjected to the following staining test:

Accelerated coffee staining test

One pound of coffee (percolator grind) was mixed with nine quarts of tap water, and percolated in an automatic percolator (Mirromatic). A sufficient quantity of the percolated coffee solution to cover the test pieces was applied to a test plate and boiled therewith for one hour. The piece was removed from the coffee solution and rinsed under tap water.

The test pieces were placed in an automatic dishwasher (Westinghouse Model 11245–10) together with 2.6 ounces of a dishwashing compound (KOL Supreme), for one complete dishwashing cycle, consisting of the following steps:
(1) Preliminary spray rinse
(2) Complete wash
(3) Two additional spray rinses
(4) Drying period While pieces were being washed, enough tap water was added to coffee solution to compensate for evaporation.

Test pieces were removed from dishwasher and observed for staining.

Cycle was repeated twenty times.

At the end of twenty cycles, the stained sample had a dark brown color as compared with its original white color. Only a small part of the stain could be removed by scouring with conventional soap powder (Rinso Blue).

EXAMPLE 2

280 grams of Cymel 1077, a melamine-formaldehyde resin molding composition containing 27% alpha-cellulose filler, color WB 360, and 120 grams of Dapon 35, a diallyl phthalate prepolymer, comprising 30% by weight of the total composition, were ground together in a porcelain ball mill for 3 hours. 240 grams of this mixture were molded as described in Example 1, and the molding was subjected to the accelerated coffee staining test as described above. At the end of 20 cycles, the stained sample had a yellow-brown color, noticeably lighter than the sample of Example 1, and a large part of this stain could be removed by scouring with conventional soap powder.

EXAMPLE 3

348 grams of Cymel 1077F, color WB 360, 12 grams of Unitaine OR–540, a titanium dioxide manufactured by American Cyanamid Company, and 40 grams of Surfex MM, a calcium carbonate by Diamond Alkali Corporation, were ground together in a porcelain ball mill for hour hours. 250 grams of this mixture were molded in the same manner as in Example 1 and the molding was subjected to the above-described staining test. At the end of 20 cycles, the stained sample had a very dark brown color which could not be removed by scouring with soap powder.

EXAMPLE 4

278 grams of Cymel 1077F, color WB 360, 12 grams of $TiO_2$ (Unitaine OR–540), 32 grams of $CaCO_3$ (Surfex MM), and 80 grams of Dapon 35 were ground together in a porcelain ball mill for 3 hours. 250 grams of this mixture were molded in the same manner as in Example 1 and the molding was subjected to the above-described staining test. After 20 cycles, the stained sample had a yellow-brown color, considerably lighter than the sample from Example 3, and part of this could be removed by scouring with soap powder. The Dapon 35 prepolymer amounted to 20% by weight of the total composition.

EXAMPLE 5

260 grams of American Viscose's alpha cellulose filled urea-formaldehyde molding compound Sylplast, white 1–MUPOL were molded in the same manner as in Example 1, and the molding was then subjected to the above-described staining test. After 20 cycles, the stained sample had a dark brown color.

EXAMPLE 6

320 grams of Sylplast White 1–MUPOL and 80 grams of Dapon 35 (20% of total composition) were ground together in a porcelain ball mill for 3 hours. 260 grams of this mixture were molded in the same manner as in Example 1, and the molding was subjected to the above-described staining test. The stained sample had a light brown color, considerably lighter than the sample from Example 5.

EXAMPLE 7

85 grams of Cymel 1077F Color CB 919 (dark brown), were molded in the conventional manner in a cup mold. After a one-minute cycle, the mold was opened and 15 grams of the mixture described in Example 4 were added to the cup which was resting in the cavity of the mold. The mold was closed under full pressure for an additional minute, and the resulting cup had a white inside layer of sufficient opacity to block the dark brown color of the base cup. When subjected to the staining test, the inside layer was stained to the same degree as the molding described in Example 4.

What is claimed is:

1. A molded article consisting essentially of a base layer of a polymerized aminoplast resin containing between about 20% and about 60% by weight of a filler material, and a surface layer integral therewith consisting essentially of a polymerized allyl ester prepolymer containing substantially no filler material, the proportion of said allyl ester being between about 5% and about 35% by weight of the total.

2. The article of claim 1 in which the aminoplast resin is a melamine-formaldehyde resin.

3. The article of claim 1 in which the aminoplast resin is a urea-formaldehyde resin.

4. The article of claim 1 in which the filler is a cellulose filler.

5. The article of claim 1 in which the allyl ester prepolymer is a diallyl phthalate prepolymer.

References Cited
UNITED STATES PATENTS

| | | | |
|---|---|---|---|
| 2,817,651 | 12/1957 | Chapin et al. | 260—856 |
| 3,131,088 | 4/1964 | Festag | 117—161 |
| 3,211,579 | 10/1965 | Reiter | 117—138.8 |

ROBERT F. BURNETT, Primary Examiner

L. M. CARLIN, Assistant Examiner

U.S. Cl. X.R.

260—17.3, 17.4, 39, 856